United States Patent [19]

Franks et al.

[11] Patent Number: 4,490,798
[45] Date of Patent: Dec. 25, 1984

[54] FUEL DISPENSING AND VEHICLE MAINTENANCE SYSTEM

[75] Inventors: James A. Franks, Fort Worth; Richard R. Martin, Grand Prairie; Richard F. Walsh, Fort Worth, all of Tex.

[73] Assignee: Art Systems, Inc., Fort Worth, Tex.

[21] Appl. No.: 331,250

[22] Filed: Dec. 16, 1981

[51] Int. Cl.³ .................. G01D 4/14; G06F 11/30; G07B 15/02
[52] U.S. Cl. .................. 364/550; 364/425; 364/478; 364/510; 235/384; 340/52 R; 340/825.31
[58] Field of Search ............ 364/465, 550, 479, 521, 364/510, 478, 551, 424, 442, 200, 900; 340/52 D, 52 R, 59, 63, 825.31, 825.34; 235/380, 381, 382, 384; 222/26, 30, 56

[56] References Cited

U.S. PATENT DOCUMENTS

| | | | |
|---|---|---|---|
| 3,894,658 | 7/1975 | Buell, Jr. | 222/26 |
| 4,034,193 | 7/1977 | Jackson | 235/151 |
| 4,085,313 | 4/1978 | Van Ness | 235/381 |
| 4,087,858 | 5/1978 | Pichler | 364/465 |
| 4,107,777 | 8/1978 | Pearson | 364/465 |
| 4,159,531 | 6/1979 | McGrath | 364/424 X |
| 4,263,945 | 4/1981 | Van Ness | 340/825.35 X |
| 4,297,569 | 10/1981 | Flies | 235/443 |

Primary Examiner—Errol A. Krass
Assistant Examiner—Kevin J. Teska
Attorney, Agent, or Firm—Robert A. Felsman

[57] ABSTRACT

A method and apparatus for dispensing fuel has features to prevent theft of fuel and also control maintenance of authorized vehicles. The system includes a portable memory unit which remains with each vehicle. At the fuel dispensing site, a data processing unit receives the portable memory unit to read from it coded information. A central processing unit is located at a central records site and connected to the remote processing unit for record storage. The remote processing unit reads a vehicle identification number and checks it for validity. The remote processing unit also reads a last mileage at which fuel was dispensed, and compares it to a current mileage entered by the operator into the remote processing unit. A next service mileage is also read by the remote processing unit and compared to the current mileage. If the current mileage is less than the last mileage, this is an indication of error, and fuel will not be dispensed. If the current mileage exceeds a next sevice mileage, the operator is notified to immediately take the vehicle to a maintenance facility for maintenance. The portable memory unit may be updated in the field with the remote processing unit to indicate a new current mileage. The memory unit can also be updated at the maintenance site to indicate a new service mileage.

13 Claims, 5 Drawing Figures

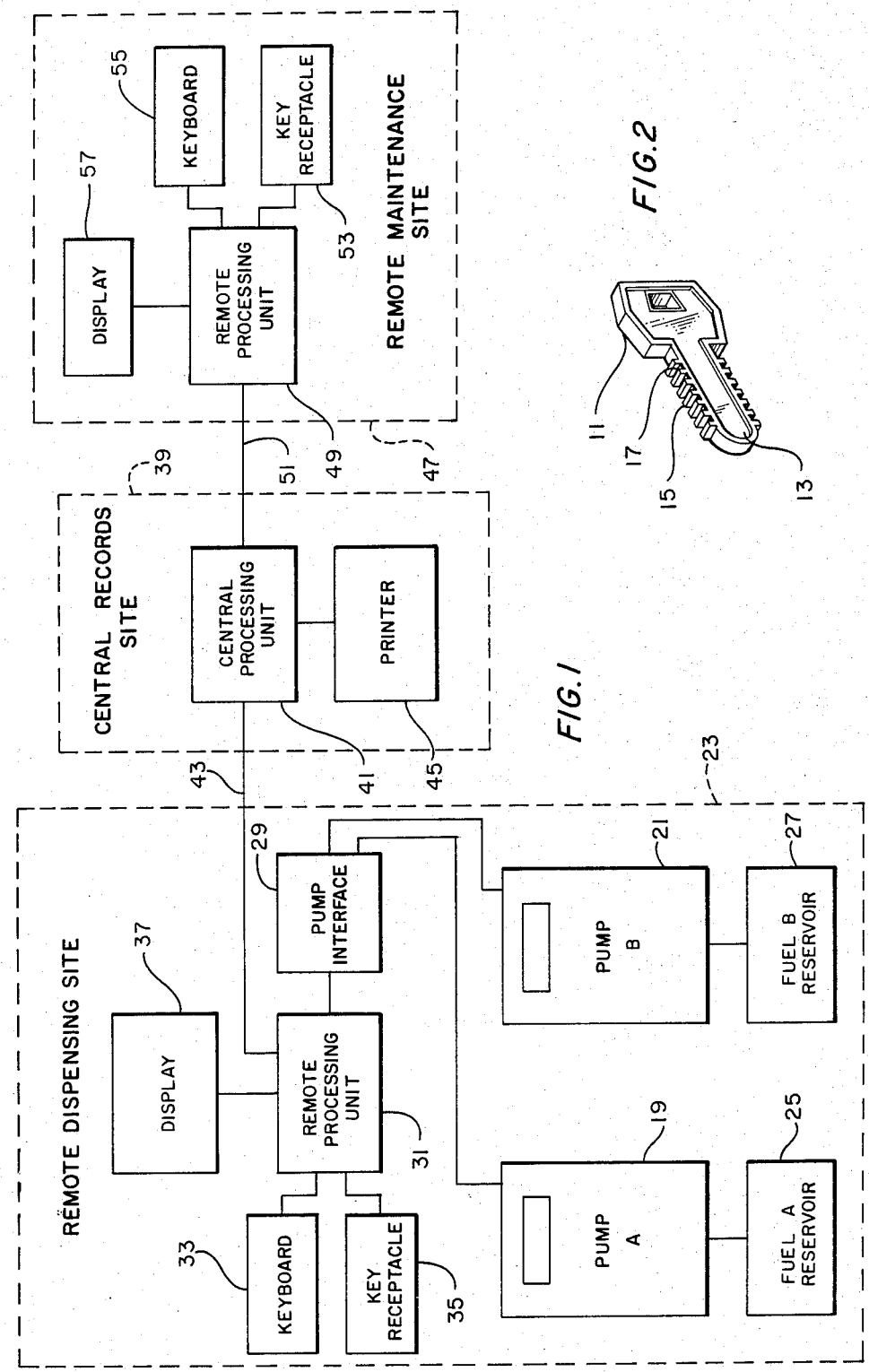

FUEL DISPENSING AND VEHICLE MAINTENANCE SYSTEM

BACKGROUND OF THE INVENTION

This invention relates in general to security systems for dispensing fuel to a motor vehicle, and in particular to a system that provides security for dispensing fuel as well as controlling maintenance of the vehicle.

Operators of a fleet of vehicles often use their own fuel dispensing sites and maintenance personnel. For example, a typical city with a population of several hundred thousand may have a large number of vehicles used by police, fire department, street and parks department, and the like. The city often will have several sites located around the city where individual operators can receive fuel for their vehicles. Usually there are one or more maintenance sites. Routine maintenance such as changing oil and lubricating the vehicle requires an operator to keep check of the current mileage and take the vehicle in for service when needed.

Security and maintenance problems are abundant in the systems. In regard to security, theft of fuel by employees and nonemployees is not uncommon. In regard to maintenance, often the operators will not have a car exclusively assigned to them, thus will be too busy and lack the feeling of responsibility necessary to assure that maintenance is performed when it is needed. Consequently, much of the maintenance performed on a vehicle results only when the vehicle needs emergency repair.

Some fleet operators, such as cities, have security systems. A typical security system utilizes a card that has an identification number punched into it or located on a magnetic strip. The pumps are controlled by a central processing unit located remote from the fuel dispensing site. To receive fuel, the card is inserted into a card reader at the site. This information is communicated to the central processing unit, which determines if the card is a valid card. If valid, the pump will be turned on for dispensing fuel.

There are problems with these types of systems. It requires that a communication link always be available between the fuel dispensing site and the central processing unit, and sometimes this is not possible. Employee theft can still occur since the cards may be stolen, or the fuel may be dispensed into a vehicle other than a city vehicle. Forged cards may be undetectable in some systems, as well. Also, these security systems have no effect on the need for assuring periodic maintenance of the vehicle.

SUMMARY OF THE INVENTION

In this invention, a system is provided that provides better security than prior art systems, and controls periodic maintenance as well. The system requires a portable memory unit, that in the preferred embodiment is in the shape of a plastic key. The key has internal electronic circuits that will store information. This information can be read and updated. External electrical contacts enable the key to be placed into a data processing unit.

A data processing unit is located at each fuel dispensing site. The data processing unit has an interface means for receiving the key. The data processing unit also has means for controlling the pumps. The remote data processing unit is linked by telephone or other means to a central processing unit at a site different from the remote proccessing unit.

Each maintenance site also has a remote processing unit. The remote proccessing units at the maintenance sites are capable of reading information from the key, and updating information. The key will typically have in its memory means an identification number, the mileage at which the vehicle last received fuel, and the mileage at which the vehicle should be next serviced.

To dispense fuel, the operator places his key in the data processing unit, which then checks to determine whether the identification number is valid. The fuel dispensing data processing unit reads the last mileage and compares this to current mileage entered by the operator through a keyboard located at the remote site. If the current mileage is less than the last mileage, fuel will not be dispensed. If the current mileage exceeds the next service mileage required, the operator will be notified and a notification will be written into the memory of the key. The system may include a provision whereby fuel will not be dispensed if the number of notifications exceed a selected maximum.

The remote processing unit monitors the fuel dispensed, and conveys this information to the central processing unit, along with the last and current mileages. The central processing unit will then be able to compute a miles per gallon. The system may have a feature for placing keys on a bad key list if the vehicle's mileage is out of selected ranges. At the maintenance site, once the next service required is performed, the mechanic enters into the key memory means the next service mileage or date.

BRIEF DESCRIPTION OF THE DRAWINGS

FIG. 1 is a block diagram schematically illustrating the components of a fuel dispensing and maintenance system in accordance with this invention.

FIG. 2 is a perspective view of a key or portable memory unit for use with the system of FIG. 1.

FIG. 3b is a continuation of the flow chart of FIG. 3a.

DESCRIPTION OF THE PREFERRED EMBODIMENT

Figure 3A:
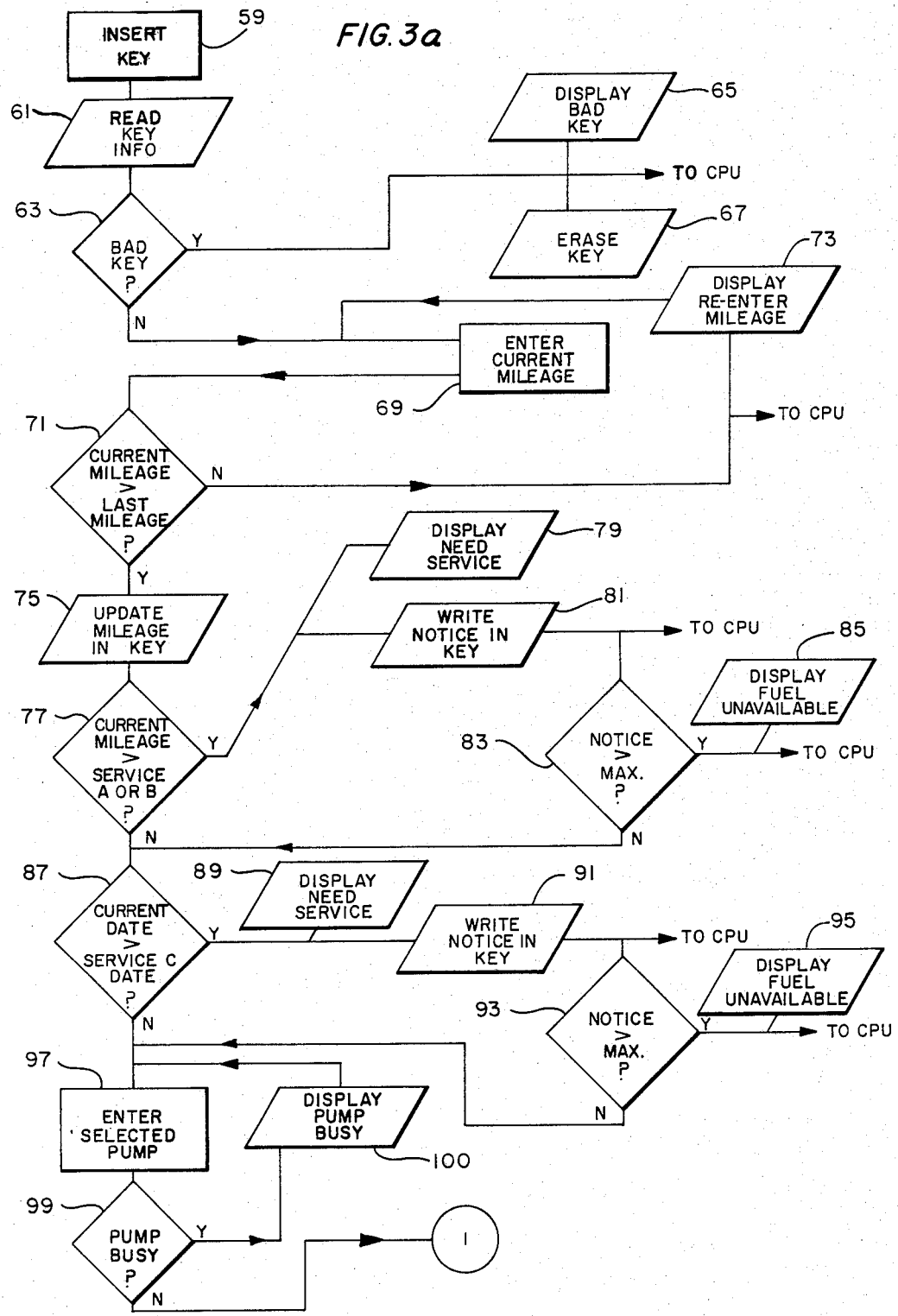
FIG. 3a is the first portion of a flow chart illustrating the steps used in obtaining fuel at the fuel dispensing site of the system of FIG. 1.

Referring to FIG. 2, the system includes for each motor vehicle a key 11. Key 11 is a commercially available device that has the general configuration of a key for conventional locks. Key 11 has a solid-state memory in it that is capable of storing more than 300 characters of information. Key 11 is constructed of plastic and has a shaft 13 containing a plurality of protruberances 15 on each edge. A metal electrical contact 17 is located between certain or all of the protuberances for making electrical contact with the internal memory. Information stored on key 11 can be retrieved for processing, updated, or new information can be entered into the storage. Key 11 is to be used with a single vehicle, and will contain selected information concerning the vehicle. In the preferred embodiment, key 11 is manufactured by Datakey, Inc. of Minneapolis, Minn.

Referring to FIG. 1, other features of the system include one or more conventional pumps, designated pumps A and B, and indicated herein as numerals 19 and 21, located at the remote fuel dispensing site 23. Each fuel pump 19 and 21 is connected to common or separate fuel reservoirs 25 and 27. Pumps 19 and 21 are controlled by an interface unit 29 that is conventional and contains means for turning on and off the pumps, and means for monitoring the amount of fuel being dispensed as the fuel is being dispensed. Pump interface 29 is controlled by a remote processing unit 31 that is a conventional small computer capable of being programmed, for making comparisons and making certain decisions. A keyboard 33 is connected to the remote processing unit 31 for entering information. A key receptacle 35 having contacts for connections with contacts 17 of key 11 (FIG. 2), is also connected to the remote processing unit 31. A display 37 is connected with the remote pocessing unit 31.

A central records site 39 is also included with the system. There will be only one central records site 39, while often there will be several remote dispensing sites 23. The central records site will be remote from the remote dispensing site 23, often several miles. A central processing unit 41 comprises a conventional computer for storing and manipulating data. Central processing unit 41 is connected by a communication link 43 to each remote processing unit 31. Communication link 43 may be telephone lines or it may be a special purpose line. A central processing unit has a printer 45 for printing information stored within.

One or more remote maintenance sites 47 are included in the system. Remote maintenance sites 47 have service facilities for repairing and servicing vehicles. Maintenance sites 47 may be located at the same place as one of the dispensing sites 23, or at a different place. Each remote maintenance site 47 has a remote processing unit 49 connected by a communication link 51 to the central processing unit. Communication link 51 may be a telephone line or a special purpose line. The remote processing unit 49 is a computer having capabilities to read and to enter information in key 11 through a key receptacle 53 connected to it. A keyboard 55 is connected to remote processing unit 49. A display 57 is connected to the remote processing unit 49.

Figure 3B:
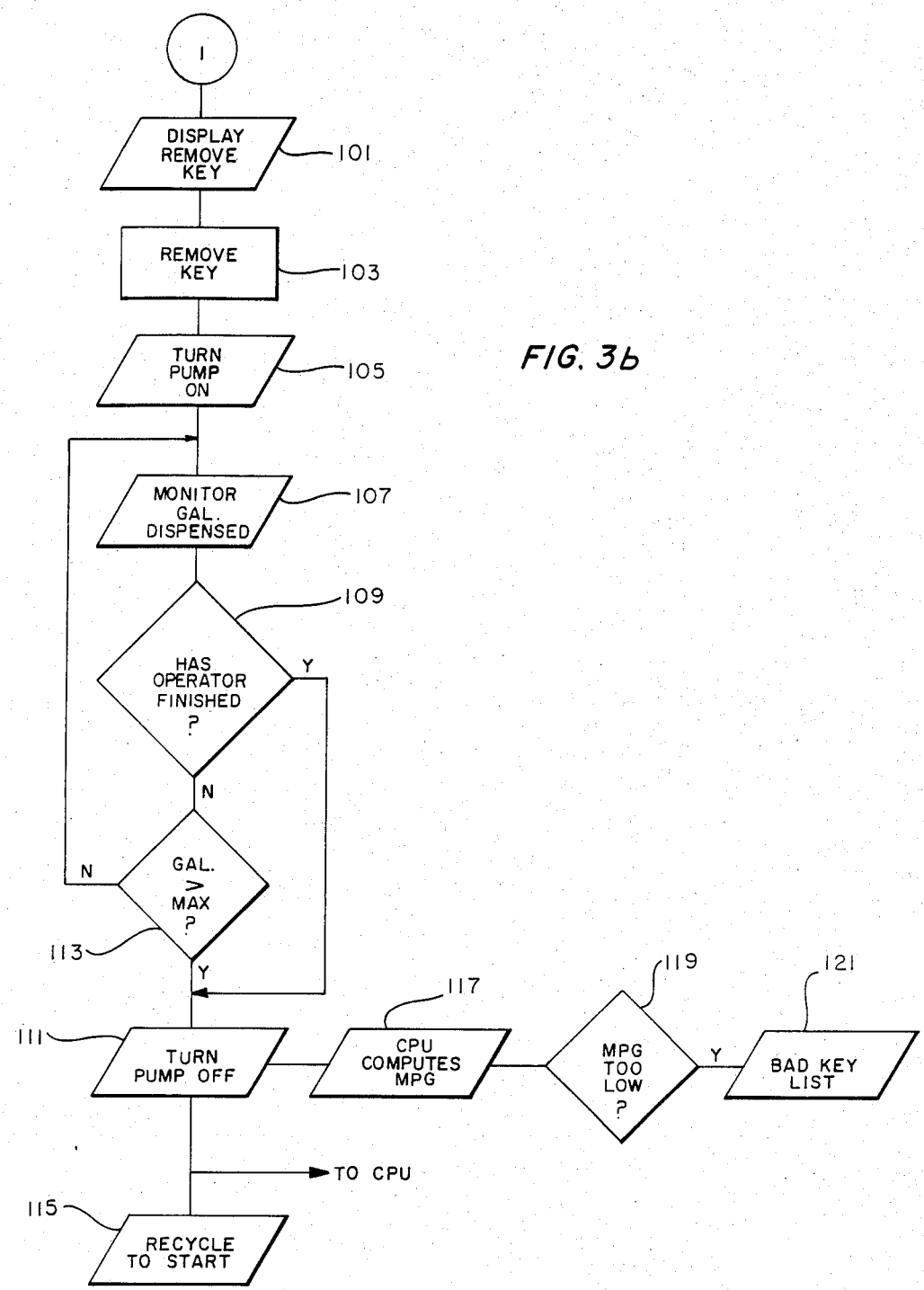

The programs for the remote processing units 31 and 49 and the central processing unit 41 can best be explained by discussing the operation in connection with FIGS. 3a and 3b. An operator of a vehicle needing fuel proceeds to a remote dispensing site 23, then inserts key 11 for that particular vehicle into key receptacle 35. This step is indicated by the numeral 59 in FIG. 3a. Once inserted, the electrical contacts 17 (FIG. 2), of key 11 will be connected to the remote processing unit 31. As indicated by block 61 of FIG. 3a the remote processing unit 31 will read the information contained in the memory means of key 11. This information includes, but is not limited to the following:

(1) An identification number for the key and vehicle;
(2) The mileage of the vehicle when fuel was last dispensed;
(3) The mileage at which service A is required;
(4) The mileage at which service B is required;
(5) The date at which service C is required;
(6) The number of times the operator has been notified of service required without having the service performed; and
(7) The fuel tank capacity.

Service A mileage will likely be the next mileage at which a frequent service is needed, such as lubricating the vehicle. Service B mileage is likely a service that occurs less frequently, such as packing the front wheel bearings of the vehicle. Service C date will be a date at which service such as lubrication is necessary, even if the mileage for this service hasn't been reached.

As indicated by block 63 the program of the remote processing unit 31 causes it to compare the key identification number with a list of identification numbers to determine whether or not the key is valid. The list is preferably stored in the remote processing unit 31. Also, the list may be of bad or invalid keys, or the list may be of valid keys. Assuming that the list is a list of bad key numbers, then it will check to determine whether or not the key of the operator is on that list. If so, the remote processing unit 31 is programmed to display "Invalid Key" as indicated by block 65, then erase all of the information on the key as indicated by numeral 67, then notify the central processing unit 41 of having taken this step.

If the key is valid, the display 37 (FIG. 1) will instruct the driver to enter current milege, which the driver will then do, as indicated by block 69, by use of the keyboard 33 (FIG. 1). A comparison then is made, as indicated by block 71, of the current mileage with respect to the last mileage that the vehicle received fuel. If the current mileage does not exceed the last mileage, then an error in entering current mileage has been made by the driver, or there is a malfunction in the system, or the driver is fraudulently attempting to obtain fuel. In any case the central processing unit 41 is notified of this abnormality, and display 37 (FIG. 1) displays "Reenter Mileage" as indicated by numeral 73. This enables the driver to try again to proceed through steps 69 and 71.

Assuming that the current mileage is greater than the last mileage, the remote processing unit 31 will then enter or write the new mileage in the memory means of key 11, as indicated by block 75. The old mileage will be deleted. Remote processing unit 31 then compares the current mileage with the service mileages A or B, as indicated by block 77. If the current mileage exceeds one of the mileages of service A or B that has been stored in the memory means of key 11, then remote processing unit 31 causes its display 37 to display "Vehicle Needs Service" as indicated by block 79. At the same time, the remote processing unit 31 will write or enter into the memory means of key 11 that the operator has been notified of a service requirement, indicated by block 81. The central processing unit 41 will receive information that a notice has been given to the operator. If desired in the system, as indicated by block 83, the remote processing unit 37 may then compare the number of notifications in key 11 with a maximum number, such as three. If the number of notices is three or more, the remote processing unit 31 will cause display 37 to display that fuel will be unavailable until service is performed, as indicated by block 85. The central processing unit 41 will be informed of this step.

If the number of notices is less than the maximum, then the next step performed, as indicated by block 87 is a comparison of the current date with the service C date. If so, remote processing unit 31 will cause its display 37 to display that service is needed, as indicated by block 89. Remote processing unit 31 will also write a notice into the memory of key 11, as indicated by block 91, and inform central processing unit 31. The remote processing unit 31 may also compare the total number of notices with a maximum selected, indicated by block 93. If greater than maximum, the operator will be notified by display 37 that fuel is unavailable until service is performed, as shown by block 95. This step will be transmitted to the central processing unit 41.

Assuming that the number of notices for services A, B and C do not exceed the maximum, the remote processing unit 31 would then request the operator to enter the selected pump 19 or 21 (FIG. 1) as indicated by block 97. Block 99 indicates that the remote processing unit 31 will determine whether or not the pump selected is busy at the moment. If so, display 37 will display that the pump is busy according to block 100, and the operator will be requested to again enter his selected pump at a later time. If the pump selected is not busy, remote processing unit 31 causes the display 37 to display to the operator to remove the key, indicated by block 101 of FIG. 3b. The operator removes key 11 according to block 103 and proceeds to the pumps 19 and 21, which are turned on at that time by pump interface 29, according to block 105.

As the driver fills his tank, pump interface 29 will monitor the gallons being dispensed, according to block 107 and continuously provide this information to the remote processing unit 31. If the operator stops pumping fuel, block 109 turns the pump off according to block 111. If the operator has not finished, and the gallons being dispensed exceeds the maximum tank capacity read from the memory of key 11 previously, remote processing unit 31 will turn the pump off once it begins to exceed maximum tank capacity, as indicated by block 113. This indicates that there is an error in the system, or the driver is using a vehicle that has a larger tank than the actual vehicle assigned to the key.

Once the pump is turned off, the remote processing unit 31 and pump interface 29 are recycled to start, according to block 115. Also, the turning off of the pump causes the remote processing unit 31 to transmit to the central processing unit 43 the total gallons dispensed. The central proccessing unit, which also receives the last mileage and current mileage, then according to block 117 computes the miles per gallon that the vehicle achieved during the last tank of fuel. Then, if desired, the central processing unit can make a comparison with a minimum figure of miles per gallon, indicated by block 119. If the figure is too low, this may indicate that fuel is being dispensed in an unauthorized vehicle, causing the central proccessing unit to place the identification number of that particular key 11 and vehicle on the bad key list. The bad key list is subsequently transmitted back to the remote processing unit 31 to erase all information from the key the next time the driver seeks to obtain additional fuel. This is indicated by block 121.

The various information forwarded to the central processing unit 41 can be forwarded at different intervals, or can remain stored in the remote proccessing unit 31 and forwarded at one time or even at a later time during the day. If the bad key list is stored in the remote processing unit 31, it does not need any signals from the central processing unit 41 to enable it to dispense fuel. Consequently, if communication link 43 is interrupted, fuel can still be dispensed until the repair is made.

Figure 4:
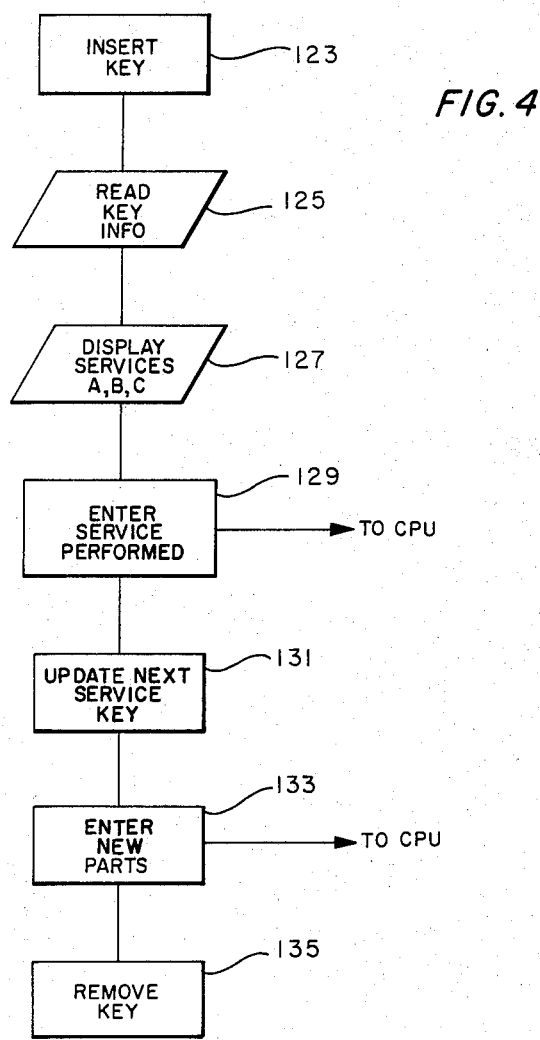
FIG. 4 is a flow chart illustrating the steps performed at the maintenance site for the system of FIG. 1.

In the normal course, once a driver is notified that a service A, B, or C is needed, he will proceed to the remote maintenance site 47 before returning to the remote dispensing site 23 for a new tank of fuel. Normally, the driver will leave the vehicle at the remote maintenance site 47. The key 11 will stay with the vehicle, where the mechanic will then insert the key into the key receptacle 53 (FIG. 2) as indicated by block 123 of FIG. 4. Block 125 indicates that the remote processing unit 49 (FIG. 2) will then read the selected information contained in the memory means of key 11. It will display to the mechanic on display 57 the services A, B, and C that are next required, as shown in block 127 of FIG. 4. The mechanic by viewing the actual mileage on the vehicle, will determine which of the services are needed.

Block 129 indicates that he performed the services and enters this into remote processing unit 49. Remote processing unit 49 notifies the central processing unit 41 of the service performed. If desired, the hours that the mechanic spent or other labor cost information can be supplied to the central processing unit 41 at this time. The mechanic, by again using keyboard 55, then updates the next service A, B, or C needed for the vehicle, replacing the old information in the memory of key 11 with this new information, this step being indicated by block 131. If desired, the central processing unit can also have facilities for storing information concerning the parts used, the costs, and inventory. If so, block 133 indicates that the mechanic will enter coded information through keyboard 55 into the remote processing unit 49, for subsequent transmittal to central processing unit 41. Block 135 indicates that the mechanic removes the key after completing the desired service. The next time the vehicle will receive fuel, the new information concerning service will be retrieved by the remote processing unit 31.

An invention having significant advantages has been provided. Use of a portable memory unit, such as the key described, which will not only provide information but can be updated in the field, provides greater security than the prior art systems and also provides means for controlling maintenance of the vehicle. The remote processing unit located at the remote dispensing site speeds up dispensing of fuel since it will not be necessary to check validity and receive other information from the central processing unit before dispensing fuel. The remote processing unit also avoids having to cease dispensing fuel in case of a breakdown in the comunication link to the central processing unit. Maintaining records of the transactions in the central processing unit provides a security check for users that are using an excessive amount of fuel or failing to have their vehicles maintained. The remote processing unit at the maintenance site enables a mechanic to update the information in the portable memory unit, and also provides a means for obtaining better cost information about the operation of particular vehicles, and the need for maintaining particular parts and inventory.

While the invention has been shown in only one of its forms, it should be apparent to those skilled in the art that it is not so limited but is susceptible to various changes and modifications without departing from the spirit of the invention.

We claim:

1. A method of dispensing fuel and indication maintenance for a motor vehicle, comprising in combination:
providing with the vehicle a portable memory means for storing, retrieving and updating selected data of the vehicle;
providing at a fuel dispensing site a remote processing unit having receptacle means for receiving the memory means, and for reading and updating the data in the memory means, and providing with the remote processing unit interface means for controlling a pump to dispense fuel and for monitoring the fuel dispensed;

inserting the memory means into the receptacle means of the remote processing unit and reading with the remote processing unit from the memory means an identification number and a next service mileage for the vehicle;

verifying with the remote processing unit that the identification number is a valid number;

entering into the remote processing unit currentmileage of the vehicle;

comparing with the remote processing unit the current mileage with the next service mileage and notifying the vehicle operator of service needs if the current mileage exceeds the next service mileage;

if the identification number is valid, turning on the pump and monitoring with the remote processing unit the amount of fuel dispensed; and performing indicated service on the vehicle and updating the next service mileage in the memory means.

2. The method according to claim 1 further comprising:

entering in the memory means with the remote processing unit an indication that the operator was notified of a service needed;

reading with the remote processing unit a total number of notifications contained in the memory means; and refusing with the remote processing unit to turn on the pump if the number of notifications exceeds a selected maximum.

3. The method according to claim 1 further comprising:

reading with the remote processing unit from the memory means the next service date;

comparing the next service date with the current date; and notifying the operator of service needs if the current date is later than the next service date.

4. A method of dispensing fuel and indicating maintenance for a motor vehicle, comprising in combination:

providing with the vehicle a key having internal memory means for storing, retrieving and updating selected data of the vehicle, and external terminal means for providing electrical connection to the memory means;

providing at a fuel dispensing site a remote processing unit having receptacle means for receiving the key and for reading, comparing and updating the data in the memory means, and providing with the remote processing unit interface means for controlling a pump to dispense fuel and for monitoring the fuel dispensed;

providing a central processing unit at a central records site remote from the fuel dispensing site with storage means for storing data transmitted to it by the remote processing unit;

providing at a maintenance site a data processing unit having interface means for receiving the key and for reading and updating the data in the memory means;

inserting the key into the remote processing unit and reading with the remote processing unit on the memory means an identification number, a last mileage and a next service mileage for the vehicle;

verifying with the remote processing unit that the identification number is a valid number;

entering into the remote processing unit the current mileage of the vehicle;

comparing with the remote processing unit the current mileage with the last mileage and refusing with the remote processing unit to turn on the pump if the current mileage is less than the last mileage;

comparing with the remote processing unit the next service mileage with the current mileage and notifying the vehicle operator of service needs if the current mileage exceeds the next service mileage;

transmitting with the remote processing unit to the central processing unit a message that the remote processing unit has notified the operator of service needs;

updating with remote processing unit in the memory means the last mileage with the current mileage;

turning on the pump with the remote processing unit if the identification number is valid and monitoring with the remote processing unit the amount of fuel dispensed;

transmitting with the remote processing unit to the central processing unit the amount of fuel dispensed, the vehicle identification number, the last mileage and the current mileage;

inserting the key into the receptacle means of the data processing unit at the remote maintenance site and reading with the data processing unit an identification number and a next service mileage;

performing needed service on the vehicle; and updating with the data processing unit a new next service mileage in the memory means of the key.

5. The method according to claim 4, further comprising:

entering into the memory means with the remote processing unit an indication that the operator was notified of a service need; and reading with the remote processing unit the total number of notifications in the memory means of the key, and transmitting the total number to the central processing unit.

6. The method according to claim 4, further comprising:

subtracting with the central processing unit the last mileage from the current mileage, dividing the difference by the gallons dispensed, and indicating the miles per gallon at the central records site.

7. The method according to claim 6, further comprising:

transmitting to the remote processing unit by the central processing unit the identification number of a vehicle if the miles per gallon calculated is less than a selected minimum, and instructing the remote processing unit to invalidate the key.

8. The method according to claim 4, further comprising:

reading by the remote processing unit from the memory means the maximum fuel capacity of the vehicle; and turning off the pump with the remote processing unit once the gallons dispensed reaches the maximum fuel capacity.

9. The method according to claim 4, further comprising:

removing the key from the remote processing unit after the identification number has been determined valid and the next service mileage checked, to cause the remote processing unit to turn on the pump.

10. A method of dispensing fuel, comprising in combination:
providing with the vehicle a key having internal memory means for storing, retrieving and updating selected data of the vehicle, and external terminal means for providing electrical connection to the memory means;
providing at a fuel dispensing site a remote processing unit having interface means for receiving the key and for reading, comparing and updating the data in the memory means, and providing with the remote processing unit interface means for controlling a pump to dispense fuel and for monitoring the fuel dispensed;
providing at a central record site a central processing unit remote from the fuel dispensing site, and providing with the central processing unit storage means for storing data transmitted to it by the remote processing unit;
inserting the key into the receptacle means of the remote processing unit and reading with the remote processing unit an identification number, a last mileage at which the vehicle received fuel, and maximum tank capacity for the vehicle;
verifying with the remote processing unit that the identification number is valid;
entering into the remote processing unit the current mileage;
comparing the current mileage with the last mileage and refusing to turn on the pump if the current mileage is less than the last mileage;
if the current mileage is greater than the last mileage, entering in the memory means with the remote processing unit the current mileage to replace the last mileage;
removing the key from the remote processing unit;
turning on the pump with the remote prcessing unit if the identification number is valid and monitoring the amount of fuel dispensed;
turning off the pump if the amount of fuel dispensed reaches maximum tank capacity;
notifying with the remote processing unit the central processing unit of the last mileage, current mileage and amount of fuel dispensed; and
subtracting with the central processing unit the last mileage from the current mileage, dividing the difference by the gallons dispensed, and indicating the mileage per gallon.

11. A system for dispensing fuel from a fuel pump at a remote dispensing site to a motor vehicle, comprising in combination:
a key for each vehicle having internal memory means for storing, retrieving and updating selected data of the vehicle, and external terminal means for providing electrical connection to the memory means;
a remote processing unit at the fuel dispensing site having means for reading data in the memory means, keyboard means for inserting a current mileage from the vehicle, and interface means connected to the pump for turning on the pump and monitoring the amount of fuel dispensed;
a central processing unit at a central record site remote from the fuel dispensing site, with storage means for storing data transmitted to it by the remote processing unit;
the remote processing unit having means for:
comparing an identification number from the memory means with a stored list of identification numbers in the remote processing unit to determine the validity of the key;
comparing a current mileage inserted into the remote processing unit through the keyboard means with a last mileage read from the key memory means;
refusing to turn on the pump if the current mileage is less than the last mileage;
monitoring the fuel dispensed and providing the amount of fuel dispensed, the current and last mileages to the central processing unit; and
updating the memory means with the current mileage.

12. A system for dispensing fuel through a fuel pump located at a remote fuel dispensing site and for indicating maintenance of a motor vehicle, comprising in combination:
a key for each vehicle having internal memory means for storing, retrieving and updating selected data of the vehicle, and external terminal means for providing electrical connection to the memory means;
a remote processing unit at the fuel dispensing site having means for reading data in the memory means, keyboard means for inserting a current mileage from the vehicle into the remote processing unit, and control means connected to the pump for turning on the pump and monitoring the amount of fuel dispensed;
a data processing unit located at a remote maintenance site having means for reading service data in the memory means and keyboard means for updating service data in the memory means;
a central processing unit at a location remote from the fuel dispensing site, with storage means for storing data transmitted to it by the remote processing unit and data processing unit;
the remote processing unit having means for:
comparing an identification number from the memory means with a stored list of identification numbers in the remote processing unit to determine validity of the key;
comparing a current mileage inserted into the data processing unit with a keyboard means with a next service mileage stored in the memory means;
displaying to the operator service needs if the current mileage is greater than the next service mileage and transmitting this information to the central processing unit; and
updating the memory means with the current mileage.

13. The apparatus according to claim 12 wherein the remote processing unit further has means to write into the memory means an indication that the operator was notified of a service need.

* * * * *